United States Patent
Tanaka et al.

(10) Patent No.: US 12,541,042 B2
(45) Date of Patent: Feb. 3, 2026

(54) POLYESTER FILM, POLARIZING PLATE AND IMAGE DISPLAY DEVICE

(71) Applicant: DAI NIPPON PRINTING CO., LTD., Tokyo (JP)

(72) Inventors: Yoshiko Tanaka, Tokorozawa (JP); Hikaru Hotta, Tsukuba (JP); Shosei Kubota, Kashiwa (JP); Takashi Kuroda, Moriya (JP); Akinobu Ushiyama, Moriya (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 343 days.

(21) Appl. No.: 18/253,327

(22) PCT Filed: Nov. 30, 2021

(86) PCT No.: PCT/JP2021/043736
§ 371 (c)(1),
(2) Date: May 17, 2023

(87) PCT Pub. No.: WO2022/118807
PCT Pub. Date: Jun. 9, 2022

(65) Prior Publication Data
US 2023/0417956 A1    Dec. 28, 2023

(30) Foreign Application Priority Data
Dec. 2, 2020    (JP) .................................. 2020-200488

(51) Int. Cl.
G02B 1/14    (2015.01)
C08J 5/18    (2006.01)
(Continued)

(52) U.S. Cl.
CPC ........ G02B 1/14 (2015.01); C08J 5/18 (2013.01); G02F 1/133528 (2013.01); C08J 2367/02 (2013.01); H10K 59/8791 (2023.02)

(58) Field of Classification Search
CPC . G02B 1/14; G02B 5/30; G02B 5/3033; C08J 5/18; C08J 2367/02; C08J 2367/00;
(Continued)

(56) References Cited

U.S. PATENT DOCUMENTS

2007/0286969 A1* 12/2007 Nagpal .................. G02B 5/305
428/1.31
2012/0229732 A1    9/2012 Koike et al.
(Continued)

FOREIGN PATENT DOCUMENTS

JP    2011-107198    6/2011
JP    2018-10821    1/2018
(Continued)

OTHER PUBLICATIONS

International Search Report of PCT/JP2021/043736, Feb. 22, 2022, 6 pages including English translation.
(Continued)

Primary Examiner — Mariam Qureshi
(74) Attorney, Agent, or Firm — HSML P.C.

(57) ABSTRACT

The present disclosure addresses the problem of providing a polyester film having favorable pencil hardness without an increase in the thickness. Disclosed is a polyester film having an average Martens hardness of 140.0 N/mm$^2$ or more at a polyester film surface, wherein a standard deviation 3σ of Martens hardness at the polyester film surface is 9.0 N/mm$^2$ or more and 36.0 N/mm$^2$ or less.

10 Claims, 2 Drawing Sheets (51) Int. Cl.
*G02F 1/1335* (2006.01)
*H10K 59/80* (2023.01)

(58) Field of Classification Search
CPC .......... G02F 1/133528; H10K 59/8791; H10K 59/8793; G09F 9/00; G09F 9/30; H05B 33/02
See application file for complete search history.

(56) References Cited

U.S. PATENT DOCUMENTS

| | | | |
|---|---|---|---|
| 2015/0111049 A1* | 4/2015 | Matsuyama | H05K 3/0047 428/458 |
| 2019/0346786 A1* | 11/2019 | Mori | G03G 15/0233 |
| 2020/0326587 A1* | 10/2020 | Heo | C09D 5/16 |
| 2021/0405272 A1 | 12/2021 | Isojima et al. | |
| 2022/0075227 A1 | 3/2022 | Isojima et al. | |
| 2022/0342135 A1 | 10/2022 | Tanaka et al. | |

FOREIGN PATENT DOCUMENTS

| | | | |
|---|---|---|---|
| JP | 2019-518241 | 6/2019 | |
| JP | 2020-79884 | 5/2020 | |
| JP | 2024069732 A | 5/2024 | |
| WO | 2014/171386 | 10/2014 | |
| WO | 2020/100926 | 5/2020 | |
| WO | 2020/138502 | 7/2020 | |
| WO | WO-2020138502 A1 * | 7/2020 | ....... G02F 1/133509 |
| WO | 2021065967 A1 | 4/2021 | |

OTHER PUBLICATIONS

Written Opinion of PCT/JP2021/043736, Feb. 22, 2022, 6 pages including English translation.

* cited by examiner

POLYESTER FILM, POLARIZING PLATE AND IMAGE DISPLAY DEVICE

TECHNICAL FIELD

The present disclosure relates to a polyester film, a polarization plate and an image display device.

BACKGROUND ART

In many cases, various optical plastic films are used for optical components of image display devices and others. For example, in an image display device with a polarization plate on a display element, a plastic film is used to protect a polarizer included in the polarization plate. As used herein, the wording "plastic film for protecting a polarizer" is sometimes referred to as a "polarizer protection film".

Plastic films for image display devices, as represented by polarizer protection films, preferably have excellent mechanical strength. For this reason, stretched plastic films are preferably used as the plastic films for image display devices. As such a plastic film, a polyester film having excellent mechanical strength and versatility is frequently used.

CITATION LIST

Patent Literature

PTL 1: JP 2011-107198 A

SUMMARY OF INVENTION

Technical Problem

Since the polyester film may be used as a surface material for an image display device, it is expected to have a predetermined pencil hardness. In particular, since it is becoming standard in recent years for an image display device to have touch panel functions, it is extremely important to suppress scratches by, for instance, increasing pencil hardness.

Unfortunately, a conventional polyester film such as a polyester film of PTL 1 has insufficient pencil hardness, and accordingly the polyester film alone is easily scratched. Thus, when the polyester film of PTL 1 is used as a surface material, it is essential to form a cured film such as a hard coating layer on the polyester film.

The pencil hardness of the polyester film can be slightly improved by increasing the thickness of the polyester film. However, if the thickness of the polyester film of PTL 1 is increased to a level at which the pencil hardness is sufficient, this goes against the trend toward a thinner image display device. Further, the polyester film of PTL 1 is intended to be a uniaxially stretched film, which causes problems such as a tendency to break in the stretch direction.

Moreover, a functional layer may be formed on the polyester film for the purpose of improving optical properties. Therefore, the polyester film is desired to have good adhesion.

An object of the present disclosure is to provide a polyester film having favorable pencil hardness without increasing the thickness and good adhesion to a functional layer, a polarization plate, and an image display device.

Solution to Problem

The present disclosure provides a polyester film, a polarization plate, and an image display device as described below.

[1] A polyester film having an average Martens hardness of 140.0 N/mm$^2$ or more at a polyester film surface, wherein a standard deviation 3σ of Martens hardness at the polyester film surface is 9.0 N/mm$^2$ or more and 36.0 N/mm$^2$ or less.

[2] The polyester film according to [1], wherein a standard deviation 3σ of an average elastic deformation power at the polyester film surface is 7.0% or less.

[3] The polyester film according to [1] or [2], having an average elastic deformation power of 40.0% or more at the polyester film surface.

[4] The polyester film according to any one of [1] to [3], having an in-plane phase difference of 300 nm or more and 1,450 nm or less.

[5] The polyester film according to any one of [1] to [4], wherein a value obtained by dividing an in-plane phase difference of the polyester film by a phase difference in a thickness direction of the polyester film is 0.15 or less.

[6] The polyester film according to any one of [1] to [5], having a thickness of 10 μm or more and 80 μm or less.

[7] A polarization plate comprising: a polarizer; a first transparent protective plate disposed on one side of the polarizer; and a second transparent protective plate disposed on the other side of the polarizer, wherein at least one of the first transparent protective plate or the second transparent protective plate is the polyester film according to any one of [1] to [6].

[8] An image display device comprising a display element and a polyester film disposed on a light emitting surface side of the display element, wherein the polyester film is the polyester film according to any one of [1] to [6].

[9] The image display device according to [8], comprising a polarizer between the display element and the polyester film.

Advantageous Effects of Invention

The polyester film, polarization plate, and image display device of the present disclosure are provided so as to have favorable pencil hardness without an increase in the thickness of the polyester film and good adhesion to a functional layer.

BRIEF DESCRIPTION OF DRAWINGS

FIG. 4 (A)-(C) are diagrams schematically illustrating how a continuous folding test looks.

DESCRIPTION OF EMBODIMENTS

Hereinbelow, embodiments of the present disclosure will be described.

[Polyester Film]

The polyester film of the present disclosure should have an average Martens hardness of 140.0 N/mm$^2$ or more and a standard deviation 3σ of Martens hardness of 9.0 N/mm$^2$ or more and 36.0 N/mm$^2$ or less at the polyester film surface.

When the average Martens hardness at the polyester film surface is less than 140.0 N/mm$^2$, the pencil hardness cannot be improved.

The average Martens hardness at the polyester film surface is preferably 145.0 N/mm$^2$ or more, more preferably 150.0 N/mm$^2$ or more, and still more preferably 160.0 N/mm$^2$ or more.

When the average Martens hardness at the polyester film surface is too large, the processability of the film may deteriorate. Further, when the average Martens hardness is too large, the adhesion of a functional layer formed on the polyester film may decrease, causing some or all of the functional layer to peel off or cracks to occur in the functional layer. In addition, when the average Martens hardness is too large, the bending resistance tends to decrease, which will be discussed later.

Thus, the average Martens hardness at the polyester film surface is preferably 280.0 N/mm$^2$ or less, more preferably 240.0 N/mm$^2$ or less, still more preferably 220.0 N/mm$^2$ or less, still more preferably 200.0 N/mm$^2$ or less, still more preferably 180.0 N/mm$^2$ or less, and still more preferably 170.0 N/mm$^2$ or less.

In the requirements shown herein, when multiple options for the upper and lower limits of each numerical value may be indicated, one of the upper limit options and one of the lower limit options may be combined to provide an embodiment of the numerical range.

In the case of the average Martens hardness at the polyester film surface, examples of the embodiment of the numerical range include 140.0 N/mm$^2$ or more and 280.0 N/mm$^2$ or less, 140.0 N/mm$^2$ or more and 240.0 N/mm$^2$ or less, 140.0 N/mm$^2$ or more and 220.0 N/mm$^2$ or less, 140.0 N/mm$^2$ or more and 200.0 N/mm$^2$ or less, 140.0 N/mm$^2$ or more and 180.0 N/mm$^2$ or less, 140.0 N/mm$^2$ or more and 170.0 N/mm$^2$ or less, 145.0 N/mm$^2$ or more and 280.0 N/mm$^2$ or less, 145.0 N/mm$^2$ or more and 240.0 N/mm$^2$ or less, 145.0 N/mm$^2$ or more and 220.0 N/mm$^2$ or less, 145.0 N/mm$^2$ or more and 200.0 N/mm$^2$ or less, 145.0 N/mm$^2$ or more and 180.0 N/mm$^2$ or less, 145.0 N/mm$^2$ or more and 170.0 N/mm$^2$ or less, 150.0 N/mm$^2$ or more and 280.0 N/mm$^2$ or less, 150.0 N/mm$^2$ or more and 240.0 N/mm$^2$ or less, 150.0 N/mm$^2$ or more and 220.0 N/mm$^2$ or less, 150.0 N/mm$^2$ or more and 200.0 N/mm$^2$ or less, 150.0 N/mm$^2$ or more and 180.0 N/mm$^2$ or less, 150.0 N/mm$^2$ or more and 170.0 N/mm$^2$ or less, 160.0 N/mm$^2$ or more and 280.0 N/mm$^2$ or less, 160.0 N/mm$^2$ or more and 240.0 N/mm$^2$ or less, 160.0 N/mm$^2$ or more and 220.0 N/mm$^2$ or less, 160.0 N/mm$^2$ or more and 200.0 N/mm$^2$ or less, 160.0 N/mm$^2$ or more and 180.0 N/mm$^2$ or less, or 160.0 N/mm$^2$ or more and 170.0 N/mm$^2$ or less.

In order to increase the average Martens hardness at the polyester film surface, it is important to increase the molecular orientation in the polyester film by stretching. Uniaxial stretching of the polyester film allows the molecules to be apparently aligned in one direction. However, with only uniaxial stretching, benzene rings of the molecules in the polyester film are oriented in various directions. In other words, with only uniaxial stretching, the molecules in the polyester film are two-dimensionally oriented but not three-dimensionally oriented. This makes it difficult for the uniaxially stretched polyester film to increase the average Martens hardness at the surface.

Biaxial stretching of polyester film makes it easier to align the orientation of benzene rings of molecules in the polyester film in the planar direction. However, if the width stretching factor, which is the second step of stretching, is too small, the orientation of the benzene rings is not sufficiently aligned in the planar direction, and the average Martens hardness of the surface is not sufficiently high. However, if the width stretching factor is too large, the in-plane orientation balance may be disturbed.

For this reason, it is preferable to make the stretching factor E2 in the width direction, which is the second step of stretching, equal to the stretching factor E1 in the flow direction, which is the first step of stretching, and more preferable to make E2 larger than E1 to make it easier to bring the average Martens hardness at the polyester film surface into the above ranges. E2/E1 is preferably 0.80 or more and 1.70 or less, more preferably 0.85 or more and 1.50 or less, still more preferably 0.90 or more and 1.40 or less, and still more preferably 1.00 or more and 1.30 or less. Further, by setting the E2/E1 in the above-described range, the standard deviation 3σ of the Martens hardness can be easily set to 36.0 N/mm$^2$ or less.

As used herein, the "the polyester film surface" in the "Martens hardness at the polyester film surface" and "average elastic deformation power at the polyester film surface" means the surface on the plane side of the polyester film. In other words, the "surface of the polyester film" does not mean the surface on the cross-sectional side of the polyester film.

As used herein, the average Martens hardness and average elastic deformation power each mean the average of measured values at 20 points. As used herein, the standard deviation of the Martens hardness means the standard deviation of the measured values at 20 points.

The 20 measurement points should be any 20 points inside a margin of a 0.5 cm region from the outer edge of the measurement sample. At this time, it is preferable to select a flat and clean portion having no specific shape or defect as the measurement point.

Although the Martens hardness and standard deviation 3σ on one surface of the polyester film should meet the predetermined ranges, it is preferable that the Martens hardness and standard deviation 3σ on both surfaces thereof meet the predetermined ranges.

Examples of the polyester film include the case of a sheet-like shape or the case of a roll-like shape.

In the case of a sheet-like polyester film, the above 20 points should be identified in the sheet-like shape.

Meanwhile, in the case of a roll-like polyester film, a sheet of a predetermined size (e.g., a length of 100 mm×a width of 100 mm) is cut out, and the above 20 points should be identified in the cut-out sheet shape. The properties of the roll-like polyester film in the flow direction are roughly the same. Accordingly, if a sheet with a length of 100 mm×width of 100 mm cut out from a given position α in the width direction satisfies predetermined conditions such as an average Martens hardness, then at the given position α, the sheet is simulated such that the every sample in the roll flow direction satisfies the predetermined conditions.

As used herein, the atmosphere for various measurements of, for instance, Martens hardness and elastic deformation power, as well as in-plane phase difference, phase difference in the thickness direction, direction of the slow axis, total light transmittance, and haze, as described below, should be at a temperature of 23° C.±5° C. and a relative humidity of 40% or more and 65% or less, unless otherwise specified. In addition, samples should be exposed to the above atmosphere for 30 minutes or more and 60 minutes or less before each measurement.

The polyester film of the present disclosure should have a standard deviation 3σ of Martens hardness of 9.0 N/mm$^2$ or more and 36.0 N/mm$^2$ or less at the polyester film surface.

In the case where the standard deviation 3σ of the Martens hardness exceeds 36.0 N/mm² at the polyester film surface, even if the average Martens hardness is 140.0 N/mm² or more, a pencil tends to bite into the polyester film at a portion where the Martens hardness is low. Specifically, the pencil hardness of the polyester film can be improved by setting the average Martens hardness at the polyester film surface to 140.0 N/mm² or more and the standard deviation 3σ of Martens hardness at the polyester film surface to 36.0 N/mm² or less.

Further, when the standard deviation 3σ of Martens hardness is too large, the adhesion of a functional layer formed on the polyester film may decrease, causing some or all of the functional layer to peel off or cracks to occur in the functional layer. By setting the standard deviation 3σ of the Martens hardness at the polyester film surface to 36.0 N/mm² or less, it can be made easier to obtain a functional layer having good adhesion.

The standard deviation 3σ of the Martens hardness at the polyester film surface is preferably 30.0 N/mm² or less, and more preferably 28.5 N/mm² or less.

As used herein, the standard deviation 3σ of the Martens hardness at the polyester film surface is calculated based on 20 measured values described above.

When the standard deviation 3σ of the Martens hardness at the polyester film surface is less than 9.0 N/mm², the physical flatness of the polyester film surface increases, resulting in a tendency to reduce the anchor effect based on surface roughness. In other words, when the standard deviation 3σ of the Martens hardness at the polyester film surface is less than 9.0 N/mm², the adhesion of the functional layer tends to decrease.

In addition, if the standard deviation 3σ of the Martens hardness at the polyester film surface is too small, condition 1 described below tends to be hardly met. If the standard deviation 3σ of the Martens hardness is too small, the processability of the polyester film may deteriorate. An example of the deterioration of the processability is the adherence of polyester films to each other. The polyester films may be wound like a roll of about 100 m or more and 8,000 m or less, or a plurality of polyester films cut into a sheet may be stacked. In this case, the polyester films may adhere to each other at their contact surfaces.

The standard deviation 3σ of the Martens hardness at the polyester film surface is preferably 12.0 N/mm² or more, and more preferably 14.0 N/mm² or more.

Examples of the embodiment of the numerical range of the standard deviation 3σ of the Martens hardness at the polyester film surface include 9.0 N/mm² or more and 36.0 N/mm² or less, 9.0 N/mm² or more and 30.0 N/mm² or less, 9.0 N/mm² or more and 28.5 N/mm² or less, 12.0 N/mm² or more and 36.0 N/mm² or less, 12.0 N/mm² or more and 30.0 N/mm² or less, 12.0 N/mm² or more and 28.5 N/mm² or less, 14.0 N/mm² or more and 36.0 N/mm² or less, 14.0 N/mm² or more and 30.0 N/mm² or less, or 14.0 N/mm² or more and 28.5 N/mm² or less.

In the polyester film of the present disclosure, the minimum Martens hardness at the polyester film surface is 100.0 N/mm² or more, more preferably 120.0 N/mm² or more, and still more preferably 135.0 N/mm² or more.

By setting the minimum Martens hardness to 100.0 N/mm² or more, it can be made easier to obtain better pencil hardness. As used herein, the "minimum Martens hardness" means the minimum of the measured values at the above 20 points.

The Martens hardness can be measured by, for example, a nanoindentation method.

First, the indentation depth h (nm) corresponding to the indentation load F (N) is continuously measured to prepare a load-unload curve. The "load-unload curve" is sometimes referred to as a "load-displacement curve". The "maximum indentation depth hmax" is analyzed from the load curve, and the projected area $A_C$ (mm²) at hmax is further analyzed. The projected area $A_C$ means an area of contact of the indenter with the polyester film. The Martens hardness HM can be calculated as a value obtained by dividing the projected area $A_C$ by the maximum indentation load Pmax (N) (the following equation (1)).

$$HM = P\max/A_C \quad (1)$$

Here, the $A_C$ is a projected area of contact obtained by applying a correction to the indenter tip curvature according to the standard method of the instrument.

The Martens hardness can be measured with an instrument capable of performing a nanoindentation method. A Fischer Instruments K. K.'s "PICODENTOR HM500" (product number) can be exemplified as such an instrument.

The Martens hardness is preferably measured under the following conditions.

<Measurement Conditions>
Indenter used: Vickers indenter (material: diamond, square pyramid shape; model number: VV005; Fischer Instruments K. K.)
Indentation condition: Maximum load
Maximum indentation load: 20 mN
Loading time: 10 seconds
Duration: 5 seconds at maximum indentation load
Unloading time: 10 seconds
Stage on which sample is placed: suction stage (as the suction stage, model number "SP2130-AD" from SMC Corporation was used.)

Before measuring the Martens hardness, it is preferable to perform a standard calibration.

The standard calibration can be performed by, for example, performing an indentation test using a standard sample having a known Martens hardness and confirming that the Martens hardness obtained from the test result is within a reference value. The standard calibration should be performed each time the sample is changed. If the sample is identical, however, it is preferable to continuously perform the measurement of the Martens hardness a plurality of times in terms of work efficiency.

In the case where the measurement of the Martens hardness is continued for a long time, it is preferable to perform the standard calibration before at least 12 hours have elapsed. For example, even in the case where the standard calibration is not performed each time the sample is changed, it is preferable to perform the standard calibration before at least 12 hours have elapsed.

If the polyester film has thereon a layer and a film, the Martens hardness of the polyester film may be measured after the layer and the film are peeled off. Examples of methods of peeling the layer or film include the following methods.

<Method of Peeling>
A sample having a 5 cm square or more is immersed in warm water of 80° C. or more and 90° C. or less for 5 minutes. The sample is then taken out from the warm water and left at room temperature for 10 minutes or more. Thereafter, the sample is further immersed in warm water for 5 minutes and taken out from the warm water. A cutter or the like is used to cut a slit in the sample. The cut is then used as a starting point to peel off the layer and film.

In the above method, it is preferable to immerse the sample in warm water while the edges of the sample are attached to a metal frame, etc.

In the polyester film of the present disclosure, the polyester film preferably has an average elastic deformation power of 65.0% or less at the polyester film surface.

By setting the average elastic deformation power to 65.0% or less, the elastic deformation can be reduced. The average elastic deformation power is more preferably from 64.0% or less.

The elastic deformation power can be calculated from the following equation after calculation of each area of the indentation work region, elastic work region, and plastic work region from the "load-unload curve" prepared in the measurement of Martens hardness.

Elastic deformation power[%]=(area of elastic work region/area of indentation work region)×100

The average elastic deformation power is preferably 40.0% or more, more preferably 50.0% or more, and still more preferably 60.0% or more to suppress plastic deformation.

Examples of the embodiment of the numerical range of the average elastic deformation power of the polyester film include 40.0% or more and 65.0% or less, 40.0% or more and 64.0% or less, 50.0% or more and 65.0% or less, 50.0% or more and 64.0% or less, 60.0% or more and 65.0% or less, or 60.0% or more and 64.0% or less.

The standard deviation 3σ of the average elastic deformation power at the polyester film surface is preferably 7.0% or less, more preferably 5.0% or less, and still more preferably 4.0% or less. By setting the standard deviation 3σ of the average elastic deformation power to 7.0% or less, it is possible to easily prevent a pencil from biting into the polyester film from a portion that is easily plastically deformed, thereby making it easier to obtain better pencil hardness of the polyester film.

The smaller the standard deviation 3σ of the average elastic deformation power, the better the pencil hardness of the polyester film. However, if the standard deviation 3σ of the average elastic deformation power is set to a predetermined value or more, the productivity of the polyester film can be enhanced. In recent years, there has been a tendency to demand a high-quality and low-cost polyester film. For this reason, the standard deviation 3σ of the average elastic deformation power at the polyester film surface is preferably 0.10% or more, more preferably 0.20% or more, and still more preferably 0.30% or more.

Although the polyester film has the average and standard deviation 3σ of the elastic deformation power on one surface at the predetermined ranges, it is preferable that the average and standard deviation 3σ on both surfaces thereof meet the predetermined ranges.

A polyester film of the present disclosure preferably has an in-plane phase difference of 300 nm or more and 1,450 nm or less. As used herein, the term "in-plane phase difference" is sometimes referred to as "Re" and the term "phase difference in the thickness direction" is sometimes referred to as "Rth".

It can be considered that a polyester film having a Re of 300 nm or more does not have a configuration in which the molecular orientation is extremely insufficient or the thickness is extremely thin. Thus, it can be made easier to obtain a favorable pencil hardness of polyester film by setting the in-plane phase difference to 300 nm or more.

The polyester film can be easily prevented from becoming thick by setting Re of the polyester film to 1,450 nm or less, and thus the image display device cannot be made thinner. In addition, by setting Re of the polyester film to 1,450 nm or less, the polarization state can be prevented from being disturbed when linearly polarized light passes through the polyester film, thereby making it possible to easily suppress rainbow pattern unevenness when viewed with the naked eyes. As used herein, the term "rainbow pattern unevenness" is sometimes referred to as "rainbow unevenness".

The lower limit of Re of the polyester film is preferably 350 nm or more, more preferably 400 nm or more, still more preferably 450 nm or more, still more preferably 500 nm or more, and still more preferably 550 nm or more. In order to improve the mechanical strength, Re of the polyester film is preferably 550 nm or more.

The upper limit of Re of the polyester film is preferably 1,400 nm or less, more preferably 1,200 nm or less, still more preferably 1,100 nm or less, still more preferably 1,000 nm or less, still more preferably 950 nm or less, still more preferably 850 nm or less, still more preferably 800 nm or less, still more preferably 700 nm or less, and still more preferably 650 nm or less. When the thickness of the polyester film is reduced to 10 μm or more and 50 μm or less, Re is preferably 1,400 nm or less.

Examples of the embodiment of the numerical range of Re of the polyester film include 300 nm or more and 1,450 nm or less, 350 nm or more and 1,450 nm or less, 400 nm or more and 1,450 nm or less, 450 nm or more and 1,450 nm or less, 500 nm or more and 1,450 nm or less, 550 nm or more and 1,450 nm or less, 300 nm or more and 1,200 nm or less, 350 nm or more and 1,200 nm or less, 400 nm or more and 1,200 nm or less, 450 nm or more and 1,200 nm or less, 500 nm or more and 1,200 nm or less, 550 nm or more and 1,200 nm or less, 300 nm or more and 1,100 nm or less, 350 nm or more and 1,100 nm or less, 400 nm or more and 1,100 nm or less, 450 nm or more and 1,100 nm or less, 500 nm or more and 1,100 nm or less, 550 nm or more and 1,100 nm or less, 300 nm or more and 950 nm or less, 350 nm or more and 950 nm or less, 400 nm or more and 950 nm or less, 450 nm or more and 950 nm or less, 500 nm or more and 950 nm or less, 550 nm or more and 950 nm or less, 300 nm or more and 850 nm or less, 350 nm or more and 850 nm or less, 400 nm or more and 850 nm or less, 450 nm or more and 850 nm or less, 500 nm or more and 850 nm or less, 550 nm or more and 850 nm or less, 300 nm or more and 1,000 nm or less, 350 nm or more and 1,000 nm or less, 400 nm or more and 1,000 nm or less, 450 nm or more and 1,000 nm or less, 500 nm or more and 1,000 nm or less, 550 nm or more and 1,000 nm or less, 300 nm or more and 800 nm or less, 350 nm or more and 800 nm or less, 400 nm or more and 800 nm or less, 450 nm or more and 800 nm or less, 500 nm or more and 800 nm or less, 550 nm or more and 800 nm or less, 300 nm or more and 700 nm or less, 350 nm or more and 700 nm or less, 400 nm or more and 700 nm or less, 450 nm or more and 700 nm or less, 500 nm or more and 700 nm or less, 550 nm or more and 700 nm or less, 300 nm or more and 650 nm or less, 350 nm or more and 650 nm or less, 400 nm or more and 650 nm or less, 450 nm or more and 650 nm or less, 500 nm or more and 650 nm or less, or 550 nm or more and 650 nm or less.

As used herein, the in-plane phase difference (Re) and the phase difference in the thickness direction (Rth) are expressed in the following equations (1) and (2) by using the refractive index nx in the slow-axis direction, which is the direction with the highest refractive index at each measurement point, the refractive index ny in the fast-axis direction, which is the direction orthogonal to the slow-axis direction at each measurement point, the refractive index nz in the thickness direction of the polyester film, and the thickness T [nm] of the polyester film. Note that as used herein, the in-plane phase difference and phase difference in the thickness direction mean values at a wavelength of 550 nm.

$$Re=(nx-ny)\times T[nm] \qquad (1)$$

$$Rth=((nx+ny)/2-nz)\times T[nm] \qquad (2)$$

The direction of the slow axis, Re, and Rth may be measured, for example, with the trade name "RETS-100", manufactured by OTSUKA ELECTRONICS CO., LTD.

In the case of measuring, for instance, Re by using the trade name "RETS-100" manufactured by OTSUKA ELECTRONICS CO., LTD, it is preferable to prepare for the measurement according to the following procedures (A1) to (A4).

(A1) First, to stabilize the light source of RETS-100, leave it on for 60 minutes or more after turning on the light source. Then, select an optical rotational analyzer method and select θ mode (a mode for angular phase difference measurement and Rth calculation). By selecting this θ mode, the stage becomes an inclined rotation stage.

(A2) Then, input the following measurement conditions to the RETS-100.

(Measurement Conditions)

Measurement range of in-plane phase difference: Optical rotational analyzer method Measurement spot diameter: ϕ5 mm Inclination angle range: 0°

Measurement wavelength range: 400 nm or more and 800 nm or less

Polyester film average refractive index: For example, in the case of polyethylene terephthalate film, input N (average refractive index)=1.617. Based on the input value of the polyester film average refractive index N, nz can be calculated by the equation "N=(nx+ny+nz)/3".

Thickness: Thickness separately measured by SEM or an optical microscope (A3) Then, obtain background data without placing the sample in this instrument. The instrument should be a closed system, and perform this procedure every time the light source is turned on.

(A4) Thereafter, place the sample on a stage in the instrument for measurement.

As used herein, the in-plane phase difference, phase difference in the thickness direction, total light transmittance, and haze each mean the average of measured values at 16 points, unless otherwise specified.

As for the 16 measurement points, a 0.5 cm region from the outer edge of the measurement sample is excluded as a margin, and 16 intersection points of lines that are drawn to divide the remaining region into five equal parts in the vertical and horizontal directions are preferably used as the center of measurement. For example, in the case where the measurement sample is a rectangle, it is preferable to perform the measurement by excluding a 0.5 cm region from the outer edge of the quadrilateral as a margin and using 16 intersection points of dotted lines that divide the remaining region into five equal parts in the vertical and horizontal directions as the center. If the measurement sample is a shape other than a rectangle, such as a circle, an ellipse, a triangle, and a pentagon, it is preferable to draw a rectangle inscribed in these shapes and measure 16 points on the rectangle by the above method.

In the polyester film of the present disclosure, the value obtained by dividing the in-plane phase difference of the polyester film by the phase difference in the thickness direction of the polyester film is preferably 0.15 or less. As used herein, the term "value obtained by dividing the in-plane phase difference of the polyester film by the phase difference in the thickness direction of the polyester film" is sometimes referred to as "Re/Rth".

The smaller Re/Rth, the closer the degree of stretching of the polyester film becomes even biaxiality. Thus, by setting Re/Rth to 0.15 or less, it may be made easier to improve the mechanical strength of the polyester film.

The Re/Rth is more preferably 0.13 or less, and still more preferably 0.10 or less.

The lower limit of Re/Rth is preferably 0.01 or more, more preferably 0.03 or more, and still more preferably 0.05 or more. When the polyester film is weakly stretched, the polyester film can be easily prevented from becoming brittle by setting the ratio to 0.01 or more. When the polyester film is strongly stretched, it can be made easier to reduce Re by setting the ratio to 0.01 or more.

The Re/Rth of a perfectly uniaxially stretched polyester film is 2.0. A general-purpose uniaxially stretched polyester film is also slightly stretched in the flow direction. Therefore, the Re/Rth of general-purpose uniaxially stretched polyester film is around 1.0.

Examples of the embodiment of the preferred numerical range of Re/Rth include 0.01 or more and 0.15 or less, 0.01 or more and 0.13 or less, 0.01 or more and 0.10 or less, 0.03 or more and 0.15 or less, 0.03 or more and 0.13 or less, 0.03 or more and 0.10 or less, 0.05 or more and 0.15 or less, 0.05 or more and 0.13 or less, or 0.05 or more and 0.10 or less.

In the polyester film of the present disclosure, the Rth is preferably 2,000 nm or more, more preferably 4,000 nm or more, and still more preferably 5,000 nm or more.

By setting Rth to 2,000 nm or more, it is easier to suppress blackout when viewed from an oblique direction through polarized sunglasses. Blackout is a phenomenon in which the entire screen appears black and the image is not visible. In addition, by setting Re to 300 nm or more and 1,450 nm or less and Rth to 2,000 nm or more, stretching of the polyester film can be brought closer to an even biaxial property, and it may be made easier to improve the mechanical strength of the polyester film.

In order to make the Rth of the polyester film in the above range, it is preferable to increase the stretching factor in the flow and width directions. By increasing the stretching factor in the flow and width directions, the refractive index nz in the thickness direction of the polyester film becomes smaller, making it easier to increase the Rth.

The Rth is preferably 9,500 nm or less, more preferably 8,000 nm or less, and still more preferably 6,000 nm or less in order to make it easier to improve the bending resistance of the polyester film.

Examples of the embodiment of the preferred numerical range of Rth include 2,000 nm or more and 9,500 nm or less, 2,000 nm or more and 8,000 nm or less, 2,000 nm or more and 6,000 nm or less, 4,000 nm or more and 9,500 nm or less, 4,000 nm or more and 8,000 nm or less, 4000 nm or more and 6,000 nm or less, 5,000 nm or more and 9,500 nm or less, 5,000 nm or more and 8,000 nm or less, or 5,000 nm or more and 6,000 nm or less.

The polyester film should satisfy the following condition 1:

<Condition 1>

A sample with a size of 50 mm long×50 mm wide is cut out from the polyester film. The direction of the slow axis is measured at a total of five points: one a at a total of five points: one point at the center of the sample and four points at 10 mm from the four corners of the sample toward the center of the sample. When angles formed by any one side of the sample and the direction of the slow axis at respective measurement points are each defined as D1, D2, D3, D4, and D5. the difference between the maximum of D1 to D5 and the minimum of D1 to D5 is 1.5 degrees or more.

If the direction of the slow axis of the polyester film is deviated, rainbow unevenness is blurred and is not easily observed. Therefore, when condition 1 is met, it is possible to easily suppress rainbow unevenness when viewed with the naked eyes.

A general-purpose stretched polyester film is designed such that the direction of the slow axis is not deviated. However, as described above, when the slow axis of the polyester film is deliberately deviated, it is possible to easily suppress rainbow unevenness. Even if the slow axis of the polyester film varies in a large region, the effect of suppressing rainbow unevenness is small. However, when the slow axis varies in a relatively small region of 50 mm long×50 mm wide, it is possible to easily suppress rainbow unevenness.

Figure 1:
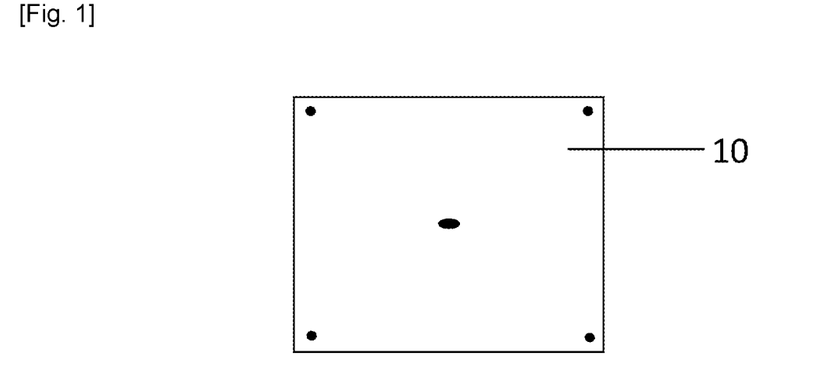
FIG. 1 is a plan view illustrating five measurement positions in condition 1.

The five black circles in FIG. 1 correspond to the five points at which the direction of the slow axis is measured under condition 1.

In condition 1, any one side of the sample serving as a reference of the angle formed by the direction of the slow axis may be any of the vertical and horizontal sides of the sample as long as the same side is used as a reference in all of D1 to D5.

Besides, satisfying condition 1 is also desirable because the polyester film has favorable bending resistance.

Meanwhile, general-purpose polyester films in which a slow axis is aligned without satisfying condition 1 tend to break after a bending test, or have a strong bending habit. Specifically, a uniaxially stretched film such as in PTL 1 breaks when subjected to a bending test along the slow axis, and have a strong bending habit when subjected to a bending test in a direction perpendicular to the slow axis. In addition, general-purpose biaxially stretched films have a strong bending habit when subjected to a bending test in a direction perpendicular to the slow axis.

The polyester film satisfying condition 1 is preferable in view of preventing a bending habit from remaining and preventing a rupture after the bending test regardless of the bending direction.

Further, in the polyester film satisfying condition 1, the standard deviation 3σ of the Martens hardness at the polyester film surface can be easily set to 9.0 N/mm$^2$ or more.

The difference between the maximum of D1 to D5 and the minimum of D1 to D5 is preferably 2.0 degrees or more, more preferably 3.0 degrees or more, still more preferably 3.5 degrees or more, and still more preferably 4.5 degrees or more.

If the difference between the maximum of D1 to D5 and the minimum of D1 to D5 is too large, the orientation of the polyester film becomes low. This makes it difficult to adjust the average Martens hardness within the above range or tends to reduce the mechanical strength. Therefore, the above difference is preferably 20.0 degrees or less, more preferably 15.0 degrees or less, still more preferably 12.0 degrees or less, and still more preferably 8.0 degrees or less.

In condition 1, examples of preferred range of the difference between the maximum and the minimum of D1 to D5 include 1.5 degrees or more and 20.0 degrees or less, 2.0 degrees or more and 20.0 degrees or less, 3.0 degrees or more and 20.0 degrees or less, 3.5 degrees or more and 20.0 degrees or less, 4.5 degrees or more and 20.0 degrees or less, 1.5 degrees or more and 15.0 degrees or less, 2.0 degrees or more and 15.0 degrees or less, 3.0 degrees or more and 15.0 degrees or less, 3.5 degrees or more and 15.0 degrees or less, 4.5 degrees or more and 15.0 degrees or less, 1.5 degrees or more and 12.0 degrees or less, 2.0 degrees or more and 12.0 degrees or less, 3.0 degrees or more and 12.0 degrees or less, 3.5 degrees or more and 12.0 degrees or less, 4.5 degrees or more and 12.0 degrees or less, 1.5 degrees or more and 8.0 degrees or less, 2.0 degrees or more and 8.0 degrees or less, 3.0 degrees or more and 8.0 degrees or less, 3.5 degrees or more and 8.0 degrees or less, or 4.5 degrees or more and 8.0 degrees or less.

If the polyester film has thereon a layer or a film that affects measurements of the in-plane phase difference, phase difference in the thickness direction, and direction of the slow axis, the in-plane phase difference, the phase difference in the thickness direction, and direction of the slow axis of the polyester film may be measured after the layer and film are peeled off. Note that the layer formed by coating usually does not affect the measurements of the in-plane phase difference, phase difference in the thickness direction, or direction of the slow axis.

The methods of peeling the layer or film that affects, for instance, the in-plane phase difference are as described above.

It is preferable that the polyester film does not crack or break after a folding test described in Examples is conducted 100,000 times, and it is more preferable that the polyester film does not crack or break after the folding test is conducted 300,000 times.

In the polyester film, when a measurement sample is placed on a leveled table after a folding test described in Examples is conducted 100,000 times, the angle at which the edge of the sample lifts off the table is preferably 20 degrees or less, and more preferably 15 degrees or less. In the polyester film, it is more preferable that the angle at which the edge of the sample is lifted satisfies the above conditions after the folding test is conducted 300,000 times. When the angle of the sample which lifts off the edge is 20 degrees or less, it means that the sample hardly has a habit due to folding.

Further, the polyester film preferably has the above-described performance in both case of being folded in the direction of the slow axis and case of being folded in the direction of the fast axis.

Note that the uniaxially stretched polyester film breaks in the stretching direction when subjected to the folding test, and a strong bending habit remains in the direction perpendicular to the stretching direction. For this reason, a biaxially stretched polyester film is preferred among stretched polyester films.

With respect to condition 1, if multiple samples with a size of 50 mm long×300 mm wide can be sampled from a sheet-like polyester film, the percentage of samples that satisfy condition 1 among the multiple samples is preferably 50% or more, more preferably 70% or more, still more preferably 90% or more, and still more preferably 100%.

In addition, the properties of the roll-like polyester film in the flow direction are roughly the same. Accordingly, if a sheet with a length of 500 mm×a width of 500 mm cut out from a given position β in the width direction satisfies condition 1, then at the given position β, the sheet is simulated such that every sample in the roll flow direction satisfies condition 1.

Examples of the lamination structure of the polyester film include a monolayer structure or a multilayer structure.

The polyester film of the present disclosure should have an average Martens hardness of 140.0 N/mm² or more at the surface, and the standard deviation 3σ of Martens hardness of 9.0 N/mm² or more and 36.0 N/mm² or less at the polyester film surface. In order to keep the average Martens hardness and the standard deviation 3σ of the Martens hardness at the polyester film surface in the above range, it is preferable to make the stretching factor in the flow direction and the width direction equally close to each other. Accordingly, controlling the stretching is crucial to bring the average Martens hardness and the standard deviation 3σ of the Martens hardness at the polyester film surface to the above-mentioned range. A polyester film with a monolayer structure is more preferred than one with a multilayer structure.

Examples of the polyester constituting the polyester film include polyethylene terephthalate (PET), polyethylene naphthalate (PEN), or polybutylene terephthalate (PBT). Among them, PET is preferred because of its low intrinsic birefringence and low in-plane phase difference.

The polyester film optionally contains additives such as absorbents that absorb special wavelengths such as a UV absorber, light stabilizers, antioxidants, antistatic agents, flame retardants, anti-gelling agents, dyes, pigments, organic particles, inorganic particles, antifouling agent, and cross-linking agents, and/or surfactants.

The lower limit of the thickness of the polyester film is preferably 10 μm or more, more preferably 15 μm or more, still more preferably 20 μm or more, still more preferably 25 μm or more, and still more preferably 30 μm or more, and the upper limit is preferably 80 μm or less, more preferably 60 μm or less, still more preferably 55 μm or less, and still more preferably 50 μm or less. In order to make the film thinner and have bending resistance, the thickness of the polyester film is preferably 50 μm or less.

By setting the thickness to 10 μm or more, it can be made easier to improve the mechanical strength. In addition, by setting the thickness to 80 μm or less, it can be made easier to reduce the in-plane phase difference.

Examples of the embodiment of the preferred numerical range of the thickness of the polyester film include 10 μm or more and 80 μm or less, 10 μm or more and 60 μm or less, 10 μm or more and 55 μm or less, 10 μm or more and 50 μm or less, 15 μm or more and 80 μm or less, 15 μm or more and 60 μm or less, 15 μm or more and 55 μm or less, 15 μm or more and 50 μm or less, 20 μm or more and 80 μm or less, 20 μm or more and 60 μm or less, 20 μm or more and 55 μm or less, 20 μm or more and 50 μm or less, 25 μm or more and 80 μm or less, 25 μm or more and 60 μm or less, 25 μm or more and 55 μm or less, 25 μm or more and 50 μm or less, 30 μm or more and 80 μm or less, 30 μm or more and 60 μm or less, 30 μm or more and 55 μm or less, or 30 μm or more and 50 μm or less.

The polyester film has a JIS K7136:2000 haze of preferably 3.0% or less, more preferably 2.0% or less, still more preferably 1.5% or less, and still further preferably 1.0% or less.

The polyester film also has a JIS K7361-1:1997 total light transmittance of preferably 80% or more, more preferably 85% or more, and still more preferably 90% or more.

The pencil hardness in the slow axis and fast axis directions is preferably HB or more, and more preferably F or more at the polyester film surface.

When the pencil hardness of the polyester film is too large, the bending resistance and adhesion of the functional layer tend to decrease. For this reason, the pencil hardness in the slow axis and fast axis directions is preferably al or less and more preferably H or less at the polyester film surface.

Examples of the embodiment of the numerical range of the pencil hardness of the polyester film include HB or more and al or less, HB or more and H or less, F or more and al or less, or F or more and H or less.

Although it is preferable the polyester film has the pencil hardness on one surface at the above range, it is more preferable that the pencil hardness on both surfaces thereof meets the above range.

As used herein, the pencil hardness of polyester film was conducted in accordance with JIS K5600-5-4:1999, except that the test pencil specified by JIS S6006 was pressed against the polyester film surface, and the following conditions were changed.

<Conditions>

Test load: 0.98 N

Sample speed: 3 mm/s

Acceptance condition: A pencil hardness test was conducted five times in the slow axis direction of each polyester film. When the polyester film was not scratched 3 times or more out of 5 times at a predetermined hardness, the polyester film passed the test at the predetermined hardness in the slow axis direction. The pencil hardness test was conducted five times in the fast axis direction of each polyester film. When the polyester film was not scratched 3 times or more out of 5 times at a predetermined hardness, the polyester film passed the test at the predetermined hardness in the fast axis direction.

The polyester film is preferably a polyester film to improve the mechanical strength. Further, it is more preferable that the stretched polyester film has a monolayer structure of polyester resin layer.

The stretched polyester film may be obtained by stretching a resin layer containing components that constitute the polyester film. Examples of the stretching technique include biaxial stretching (e.g., sequential or simultaneous biaxial stretching) or uniaxial stretching (e.g., longitudinal uniaxial stretching). Among them, biaxial stretching is preferred because it is easier to lower the in-plane phase difference and to increase the mechanical strength. In other words, the stretched polyester film is preferably a biaxially stretched polyester film. Among the biaxially stretched polyester film, a biaxially stretched polyethylene terephthalate film is preferred.

Sequential Biaxial Stretching

In sequential biaxial stretching, a casting film is stretched in the flow direction followed by stretching in the width direction of the film.

The stretching in the flow direction is usually implemented by varying the peripheral speed of a pair of the stretching rolls. The stretching in the flow direction may be implemented in one step or in multiple steps using multiple pairs of stretching rolls. In order to suppress excessive variation in physical properties such as the Martens hardness and in-plane phase difference, it is preferable to have multiple nip rolls in close proximity to the stretching rolls. The stretching factor in the flow direction is usually 2.0 times or more and 15.0 times or less. The stretching factor is preferably 2.0 times or more and 7.0 times or less, more preferably 3.0 times or more and 5.0 times or less, and still more preferably 3.0 times or more and 4.0 times or less, in order to suppress excessive variation in physical properties such as the Martens hardness and in-plane phase difference.

The stretching temperature is preferably at the glass transition temperature or more of the resin and at the glass transition temperature+100° C. or less to provide a moderate variation in Martens hardness and prevent excessive variation in physical properties such as the in-plane phase difference. For PET, preferred is 70° C. or more and 120° C. or less, more preferred is 80° C. or more and 110° C. or less, and still more preferred is 95° C. or more and 110° C. or less. The stretching temperature means the temperature setting of the instrument. Even if the temperature setting of the instrument is set to the above range, it takes time for the temperature to stabilize. Therefore, it is preferable to produce the polyester film after the temperature is set in the above range and the temperature is also stabilized. In this specification, the temperature setting of the instrument is described in several places. It is preferable to produce the polyester film after the temperature is stabilized, as well as the temperature settings at other sections, as described above.

With respect to the stretching temperature, the temperature of the film may be rapidly increased to shorten the section stretched at low temperatures. This tends to make smaller the in-plane phase difference. Meanwhile, the temperature of the film may be slowly increased to make the section stretched at low temperatures longer. This increases orientation and tends to make larger the in-plane phase difference and smaller the variation in the slow axis. In addition, the temperature of the film may be slowly increased to make the section stretched at low temperatures longer. This tends to make it easier to bring the average Martens hardness and the standard deviation 3σ of the Martens hardness into the above ranges.

At the time of heating during stretching, it is preferable to use a heater that creates turbulence. Heating with the turbulence-containing air causes a temperature difference in a minute region within the film surface. The temperature difference facilitates the occurrence of minute misalignment in the orientation axis, making it easier to satisfy condition 1 and achieve a standard deviation 3σ of the Martens hardness of 9.0 N/mm² or more. However, it is preferable to adjust the intensity of turbulence, taking into account that if the turbulence is too strong, the average Martens hardness may become too small or the standard deviation 3σ of Martens hardness may become too large.

The film stretched in the flow direction may be given functions such as better lubricity, better adhesiveness, and antistatic properties by in-line coating or offline coating. Also, surface treatment such as corona treatment, flame treatment, or plasma treatment may be optionally applied prior to the in-line coating or offline coating.

The layer formed by in-line coating or offline coating is herein not counted as the number of layers constituting the polyester film.

The stretching in the width direction is usually performed using the tenter method, in which both ends of the film are gripped with clips and the film is stretched in the width direction while being conveyed. The stretching factor in the width direction is usually 2.0 times or more and 15.0 times or less, and preferably 2.0 times or more and 7.0 times or less, more preferably 3.0 times or more and 6.0 times or less, and still more preferably 4.0 times or more and 6.0 times or less in order to suppress excessive variation in physical properties such as the in-plane phase difference.

It is preferable to make the stretching factor E2 in the width direction, which is the second step of stretching, equal to the stretching factor E1 in the flow direction, which is the first step of stretching, and more preferable to make E2 larger than E1 to make it easier to bring the average Martens hardness and the standard deviation 3σ of Martens hardness into the above ranges. E2/E1 is preferably 0.80 or more and 1.70 or less, more preferably 0.85 or more and 1.50 or less, still more preferably 0.90 or more and 1.40 or less, and still more preferably 1.00 or more and 1.30 or less.

The stretching temperature is preferably at the glass transition temperature or more of the resin and at the glass transition temperature+110° C. or less. The temperature should increase from upstream to downstream. The stretching temperature means the temperature setting of the instrument. The upstream side is the side near the point where stretching in the width direction begins, while the downstream side is the side near the point where stretching in the width direction ends. Specifically, when the stretching section in the width direction is divided into two parts based on the length, the difference between the upstream and downstream temperatures is preferably 20° C. or more, more preferably 30° C. or more, still more preferably 35° C. or more, and still more preferably 40° C. or more. In addition, for PET, the stretching temperature at the first step is preferably 80° C. or more and 120° C. or less, more preferably 90° C. or more and 110° C. or less, and still more preferably 95° C. or more and 105° C. or less. By dividing the stretching section in the width direction into two parts and providing a difference in stretching temperature between the first and second stages, the surface temperature of the film during the first stage of stretching and the surface temperature of the film during the second stage of stretching can be controlled at different temperatures. This prevents orientation and oriented crystallization from progressing too far in each stretching stage, and prevents the plastic film from becoming brittle, thereby making it easier to improve pencil hardness.

The sequentially biaxially stretched polyester film as so obtained is preferably heat-treated at the stretching temperature or more and less than the melting point in a tenter in order to provide flatness and dimensional stability. The heat treatment temperature means the temperature setting of the instrument. Specifically, for PET, heat fixation is performed in the range preferably 140° C. or more and 240° C. or less and more preferably 200° C. or more and 250° C. or less. In addition, in order to suppress excessive variation in physical properties such as the Martens hardness and the in-plane phase difference, it is preferable to additionally perform stretching of 1% or more and 10% or less in the first half of heat treatment.

The polyester film is heat-treated, slowly cooled to room temperature, and then rolled up. In addition, the polyester film is optionally subjected to relaxation or other treatment used in combination with heat treatment and slow cooling. The relaxation rate during heat treatment is preferably 0.5% or more and 5% or less, more preferably 0.5% or more and 3% or less, still more preferably 0.8% or more and 2.5% or less, and still more preferably 1% or more and 2% or less to suppress excessive variation in physical properties such as the Martens hardness and the in-plane phase difference. In addition, the relaxation rate during slow cooling is preferably 0.5% or more and 3% or less, more preferably 0.5% or more and 2% or less, still more preferably 0.5% or more and 1.5% or less, and still more preferably 0.5% or more and 1.0% or less to suppress excessive variation in physical properties such as the Martens hardness and the in-plane phase difference. The temperature during slow cooling is preferably or more and 140° C. or less, more preferably 90° C. or more and 130° C. or less, and still more preferably 100° C. or more and 130° C. or less, and still more preferably 100° C. or more and 120° C. or less to improve the flatness. The temperature during slow cooling means the temperature setting of the instrument.

Simultaneous Biaxial Stretching

In simultaneous biaxial stretching, a casting film is guided to a simultaneous biaxial tenter, where it is conveyed while clipped at both ends and stretched simultaneously and/or stepwise in the flow and width directions. Examples of the simultaneous biaxial stretching machine include a pantograph type, screw type, drive motor type, or linear motor type machine. Here, the stretching factor can be changed optionally. Preferred is a drive motor type or linear motor type machine that can perform the relaxation process at any location.

The magnification of simultaneous biaxial stretching is usually 6.0 times or more and 50.0 times or less as the area factor. The area factor is preferably 8.0 times or more and 30.0 times or less, more preferably 9.0 times or more and 25.0 times or less, still more preferably 9.0 times or more and 20.0 times or less, and still more preferably 10.0 times or more and 15.0 times or less, in order to suppress excessive variation in physical properties such as the Martens hardness and the in-plane phase difference. In simultaneous biaxial stretching, it is preferable to adjust the stretching factor in the flow and width directions so that the area factor is in the range of 2.0 times or more and to 15.0 times or less.

In addition, in the case of simultaneous biaxial stretching, it is preferable that the stretching factors in the flow and width directions are the same and that the stretching speed is almost the same in order to suppress the in-plane orientation difference. Further, the stretching speed is made almost equal while the stretching factors in the flow and width directions are made the same in the simultaneous biaxial stretching. This tends to make it easier to bring the average Martens hardness and the standard deviation 3σ of the Martens hardness into the above ranges.

The stretching temperature for simultaneous biaxial stretching is preferably at the glass transition temperature or more of the resin and at the glass transition temperature+120° C. or less to prevent excessive variation in optical properties such as the in-plane phase difference. For PET, preferred is from 80° C. or more and 160° C. or less, more preferred is from 90° C. or more and 150° C. or less, and still more preferred is from 100° C. or more and 140° C. or less. The stretching temperature means the temperature setting of the instrument.

The simultaneously biaxially stretched film is preferably subsequently heat-treated at the stretching temperature or more and less than the melting point in a heat fixing chamber in a tenter in order to provide flatness and dimensional stability. The temperature of the heat treatment means the temperature setting of the instrument. The heat treatment conditions described above are the same as those after the sequential biaxial stretching.

<Form, Size>

The polyester film may be in a sheet-like form cut to a predetermined size or in a roll-like form in which a long sheet is wound like a roll. The size of sheet is not particularly limited, but the maximum diameter should be about 2 inches or more and 500 inches or less. In the present disclosure, the size of sheet is preferably 30 inches or more and 100 inches or less, and more preferably 40 inches or more and 100 inches or less. The "maximum diameter" refers to the maximum length of the polyester film when any two points are connected. For example, if the polyester film is rectangular, the diagonal of the rectangle region is the maximum diameter. If the polyester film is circular, the diameter thereof is the maximum diameter.

The width and length of the roll are not particularly limited, but the width is generally 200 mm or more and 8,000 mm or less, and the length is 100 m or more and 8,000 m or less. The roll-shaped polyester film may be cut into single sheets according to the size of the image display device, and then used. It is preferable to exclude, during cutting, roll edges where the properties are unstable.

In addition, the shape of the sheet is not particularly limited and may be, for instance, polygonal (e.g., triangular, quadrangular, or pentagonal) or circular, or a random irregular shape. More specifically, if the polyester film is quadrangular, the aspect ratio is not particularly limited as long as there are no problems with the display screen. For example, width:height=1:1, 4:3, 16:10, 16:9, 2:1, or 5:4.

<Applications>

The polyester film of the present disclosure is provided so as to have favorable pencil hardness without an increase in the thickness. Therefore, the polyester film of the present disclosure can be suitably used as a polyester film for an image display device, especially for an image display device with a touch panel.

The polyester film of an embodiment of the present disclosure satisfying condition 1 may prevent a bending habit from remaining and prevent a rupture after the bending test, regardless of the bending direction. Therefore, it can be suitably used as a polyester film for an image display device with curved surfaces or a foldable image display device.

Examples of the polyester film used for an image display device include: a polyester film to protect a polarizer; and a polyester film used as a base material for various functional films (e.g., a surface protection film, an anti-reflection film, a conductive film that constitutes a touch panel).

[Optical Laminate]

The polyester film of the present disclosure may be further formed with functional layers such as a protective layer, an antireflection layer, a hard coating layer, an antiglare layer, a phase difference layer, an adhesive layer, a transparent conductive layer, an antistatic layer, and an antifouling layer to form an optical laminate.

The functional layer of the optical laminate preferably includes an antireflection layer. The antireflection layer is preferably disposed on the topmost surface on the side of the polyester film with the functional layer. Having an antireflection layer as a functional layer of the optical laminate makes it easier to suppress rainbow unevenness.

It is more preferable for the functional layer to include a hard coating layer and an antireflection layer. When the functional layer includes a hard coating layer and an antireflection layer, the hard coating layer and the antireflection layer are preferably arranged in this order on the polyester film.

The hard coating layer and the antireflection layer can be applied to general-purpose products.

[Polarization Plate]

The polarization plate of the present disclosure is a polarization plate comprising: a polarizer; first transparent protective plate disposed on one side of the polarizer; and a second transparent protective plate disposed on the other side of the polarizer, wherein at least one of the first transparent protective plate or the second transparent protective plate is the above-described polyester film of the present disclosure.

The polarization plate is used to provide antireflective properties by combining, for instance, the polarization plate and a λ/4 phase shifter. In this case, the λ/4 phase shifter is disposed on the display element of the image display device, and the polarization plate is disposed on the viewer's side of the display device relative to the λ/4 phase shifter.

In the case of using the liquid crystal display device, the polarization plate is used to provide a liquid crystal shutter function. In this case, the liquid crystal display device is arranged from the backlight side in the order of a lower polarization plate, a liquid crystal display element, and an upper polarization plate. Here, the absorption axis of the polarizer of the lower polarization plate and the absorption axis of the polarizer of the upper polarization plate are arranged orthogonally. In the configuration of the liquid crystal display device, the polarization plate in the present disclosure can be used as the upper or lower polarization plate, and preferably as the upper polarization plate. In the upper polarization plate, it is preferable to use the optical film of the present disclosure as a transparent protective plate on the light emitting surface side of the polarizer. In the lower polarization plate, it is preferable to use the optical film of the present disclosure as a transparent protective plate on the light incident surface side of the polarizer.

<Transparent Protective Plate>

The polarization plate in the present disclosure includes the above-described optical film of the present disclosure used as at least one of the first transparent protective plate or the second transparent protective plate. The first transparent protective plate and second transparent protective plate are each preferably an optical plastic film of the present disclosure as described above.

In the case where one of the first transparent protective plate or the second transparent protective plate is an optical plastic of the present disclosure as described above, the other transparent protective plate is not particularly limited, but an optically isotropic transparent protective plate or a transparent protective plate containing biomass materials is preferred. As used herein, the optically isotropic transparent protective plate refers to a product having an in-plane phase difference of less than 20 nm or less, preferably 10 nm or less, and more preferably 5 nm or less. Examples of the transparent protective plate with optical isotropy include acrylic film, triacetyl cellulose film, polycarbonate film, and amorphous olefin film.

When only one of the first transparent protective plate or the second transparent protective plate includes the optical film of the present disclosure as described above, it is preferable to use the above-described optical film of the present disclosure as the transparent protective plate on the light emitting side.

The first transparent protective plate and the second transparent protective plate may be in direct contact with the polarizer, or may be in contact with the polarizer via an adhesive layer.

<Polarizer>

Examples of the polarizer include a sheet-type polarizer formed by stretching an iodine-dyed film (e.g., a polyvinyl alcohol film, a polyvinyl formal film, a polyvinyl acetal film, an ethylene-vinyl acetate copolymer-based saponified film), a wire grid-type polarizer composed of many parallel metal wires, a coated polarizer coated with a lyotropic liquid crystal or dichroic guest-host material, or a multilayer thin-film polarizer. These polarizers may be reflective polarizers with a function of reflecting a non-transmittable polarization component.

The polarizer is preferably arranged so that the angle formed between the absorption axis thereof and the direction of the slow axis of the polyester film is within 90 degrees±5 degrees. As used herein, the above angle is more preferably within 90 degrees±3 degrees, and still more preferably within 90 degrees±1 degree.

[Image Display Device]

The image display device of the present disclosure includes a display element and a polyester film disposed on the light emitting surface side of the display element, wherein the polyester film is the above-described polyester film of the present disclosure.

Figure 2:
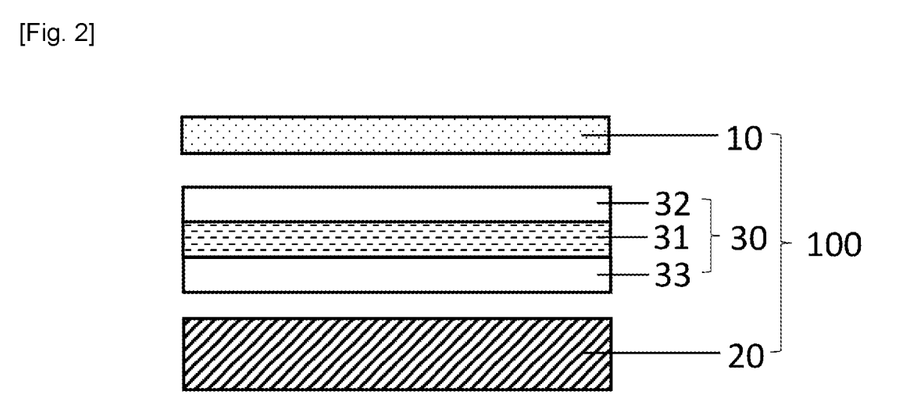
FIG. 2 is a cross-sectional view of an embodiment of an image display device in the present disclosure.
Figure 3:
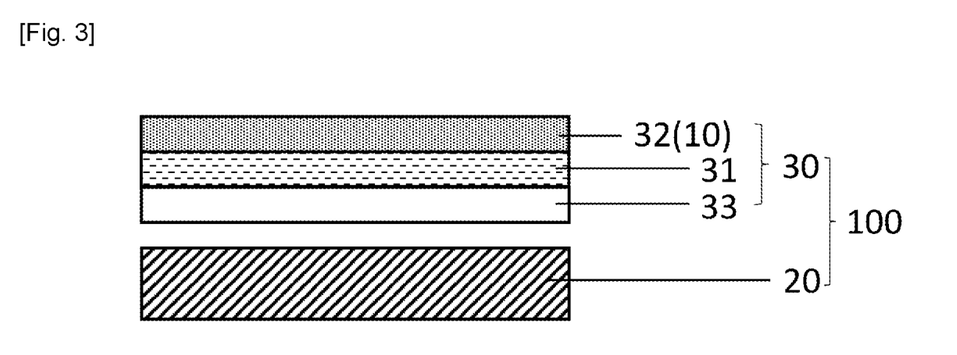
FIG. 3 is a cross-sectional view of another embodiment of the image display device in the present disclosure.

FIGS. 2 and 3 are each a cross-sectional view of an embodiment of image display device 100 in the present disclosure.

Each image display device 100 shown in FIGS. 2 and 3 has a polyester film 10 on the light emitting surface side (the upper side of FIGS. 2 and 3) of a display element 20. Each image display device 100 shown in FIGS. 2 and 3 has a polarizer 31 between the display element 20 and the polyester film 10. In FIGS. 2 and 3, a first transparent protective plate (32) and a second transparent protective plate (33) are layered on both sides of the polarizer 31. Note that in the image display device shown in FIG. 3, the polyester film 10 is used as the first transparent protective plate (32).

The image display device preferably includes a polarizer between the display element and the polyester film.

When the image display device includes the polarizer, the polyester is preferably arranged so that the angle formed between the absorption axis thereof and the direction of the slow axis of the polyester film is within 90 degrees±5 degrees. As used herein, the above angle is more preferably within 90 degrees±3 degrees, and still more preferably within 90 degrees±1 degree.

The image display device 100 is not limited to the forms shown in FIGS. 2 and 3. For example, in FIGS. 2 and 3, the respective members constituting the image display device 100 are arranged at predetermined intervals. However, the respective members may be integrated by means of an adhesive layer or other means. The image display device may have another member(s) (not shown) such as an optical film. For example, the image display device may have a surface plate (e.g., a glass plate, plastic plate). When the image display device includes the surface plate, the optical film of the present disclosure may be layered onto the surface plate.

<Display Element>

Examples of the display element include a liquid crystal display element, an EL display element (e.g., an organic EL display element, an inorganic EL display element), or a plasma display element. Further examples include an LED display element (e.g., a mini-LED or micro-LED display element) or a liquid crystal display element and an LED display element using QD.

When the display element of display device is a liquid crystal display element, a backlight is required on a surface on the side opposite to a resin sheet of the liquid crystal display element.

The image display device may be an image display device with a touch panel function.

Examples of the touch panel include a resistive film-type, electrostatic capacitance-type, electromagnetic induction-type, infrared-type, or ultrasonic-type touch panel.

The touch panel function may be a function added within the display element, such as an in-cell touch panel LCD display element, or a touch panel disposed on the display element.

If the polyester film satisfies condition 1, the optical film may prevent a bending habit from remaining and prevent a rupture after the bending test. For this reason, if the polyester film satisfies condition 1, the image display device is preferably an image display device with curved surfaces or a foldable image display device.

When the image display device is an image display device with curved surfaces or a foldable image display device, the display element is preferably an organic EL display element.

Examples of the polyester film disposed on the light emitting surface side of the display element include: a polyester film to protect a polarizer; and a polyester film used as a base material for various functional films (e.g., a surface protection film, an anti-reflection film, a conductive film that constitutes a touch panel).

<Other Plastic Film>

The image display device of the present disclosure may have another plastic film(s) to the extent that they do not interfere with the effects of the present disclosure. There may be only one or two or more of the other plastic films.

When a plurality of plastic films are included on the display element, it is preferable that the plastic film farthest from the display element is the polyester film of the present disclosure.

EXAMPLES

Next, the present disclosure is further described in detail with Examples, but the present discloser is no way limited to these Examples.

1. Measurement and Evaluation

The atmosphere for measurements and evaluations in the following sections 1-1 to 1-8 should be at a temperature of 23° C.±5° C. and a relative humidity of 40% or more and 65% or less. In addition, measurement samples should be exposed to the above atmosphere for 30 minutes or more and 60 minutes or less before each measurement and evaluation. In addition, each measurement sample should be sampled from a clean portion without breakage. The measurements and evaluations should be performed in a state in which the flatness of the sample is good. The results are shown in Table 1.

1-1. Average Martens Hardness (HM), Standard Deviation of Martens Hardness (HM 3σ), and Elastic Deformation Power Samples of 50 mm in the flow direction×50 mm in the width direction were cut out from the polyester films of Examples and Comparative Examples produced or prepared in the below-described section "2". The samples were measured at 20 points under the following conditions using a Fischer Instruments K.K.'s "PICODENTOR HM500" (product number) as a measurement instrument. The average Martens hardness, standard deviation 3σ of Martens hardness, elastic deformation power, and standard deviation 3σ of the elastic deformation power were each calculated. The measurement of 20 points in one sample was continuously performed. As measurement and analysis software, software (product name "WIN-HCU", version 3.5) attached to the above measurement instrument was used. A part of the operation procedure of the software during measurement is shown below. The standard deviation 3σ of the Martens hardness was also calculated in the same manner for Reference Example 1 to 3. The average indentation depth of the indenter was 2.2 μm in Examples 1 to 3, 2.0 μm in Example 4, 2.5 μm in Comparative Example 1, 2.4 μm in Comparative Example 2, 2.2 μm in Comparative Example 3, 2.1 μm in Comparative Example 4, 2.0 μm in Reference Example 1 to 2, and 1.8 μm in Reference Example 3. In Tables 1 and 2, the term "average Martens hardness" is referred to as "HM" and the term "standard deviation of Martens hardness" as "HM 3σ".

The first measurement of each sample was not used as data due to possibilities of outliers. Therefore, in practice, the measurement was performed at 21 points in each sample to calculate HM, HM 3σ, and elastic deformation power using data at the second to 21st points.

Before the measurement of each sample, the standard calibration was performed, in which an indentation test was performed using a standard sample (an acrylic plate manufactured by Fischer Instruments K.K.) having a known Martens hardness to confirm that the Martens hardness obtained from the test result was within a reference value. The standard calibration was performed each time the sample was changed.

<Measurement Conditions>

Indenter used: Vickers indenter (material: diamond, square pyramid shape; model number: VV005; Fischer Instruments K. K)

Indentation condition: Maximum load

Maximum indentation load: 20 mN

Loading time: 10 seconds

Duration: 5 seconds at maximum indentation load

Unloading time: 10 seconds

Stage on which sample is placed: suction stage (as the suction stage, model number "SP2130-AD" from SMC Corporation was used.)

<Part of Operation Procedure of Software>

Press the "New" button. Select "Application Properties" from the "Edit" tab to open the application properties. Press the ">>>" icon for the load increase setting in the "Test Parameter Settings" box of the application properties to open "Load Increase Parameters". Confirm that "dSQRT(F)/dt=constant" and "Maximum load" are selected in the load increase parameters. Further, in the load increase parameters, enter 20 [mN] for the maximum test load, and select "Time setting for load application" to enter 10 [s] for the time.

1-2. In-Plane Phase Difference (Re) and Phase Difference in Thickness Direction (Rth)

The in-plane phase difference and phase difference in the thickness direction at 16 points were each measured using the same sample as in the section 1-1 according to the description in the main text of the present specification to calculate the average at 16 points. Table 1 shows Re, Rth, and Re/Rth calculated from the measurement results. The measurement instrument used was by using the product name "RETS-100 (measurement spot: 5 mm in diameter)" manufactured by OTSUKA ELECTRONICS CO., LTD.".

1-3. Direction of Slow Axis

The direction of the slow axis was measured at a total of five points: four points at 10 mm from the four corners of the same sample as in the section 1-1 toward the center of the sample; and the center of the sample. The measurement instrument used was by using the product name "RETS-100 (measurement spot: 5 mm in diameter)" manufactured by OTSUKA ELECTRONICS CO., LTD.". The direction of the slow axis was measured in the range of 0 to ±90 degrees with the flow direction of the polyester film as a reference of 0 degrees.

1-4. Pencil Hardness

A pencil hardness test was conducted by pressing a test pencil specified by JIS 56006 against the polyester film surface in each Example and Comparative Example. The pencil hardness test was conducted in accordance with JIS K5600-5-4:1999, except that the following conditions were changed. Table 1 shows the highest hardness among pencils satisfying the following acceptance conditions in the slow axis direction and the fast axis direction of each polyester film.

<Conditions>
 Test load: 0.98 N
 Sample speed: 3 mm/s
 Acceptance condition: A pencil hardness test was conducted five times in the slow axis direction of each polyester film. When the polyester film was not scratched 3 times or more out of 5 times at a predetermined hardness, the polyester film passed the test at the predetermined hardness in the slow axis direction. The pencil hardness test was conducted five times in the fast axis direction of each polyester film. When the polyester film was not scratched 3 times or more out of 5 times at a predetermined hardness, the polyester film passed the test at the predetermined hardness in the fast axis direction.

1-5. Bending Resistance

<Width Direction>

A sample strip having a short side (width direction) of 30 mm×a long side (flow direction) of 100 mm was cut out from the polyester film in each of Examples and Comparative Examples. A continuous folding test was conducted 100,000 times by using a durability tester (product name "DLDMLH-FS", manufactured by YUASA SYSTEM Co., Ltd.), in which both ends of the sample on the short side (30 mm) were fixed (each site 10 mm away from the tip was fixed) and then folded 180 degrees. The folding speed was 120 times per minute. A more detailed protocol for the folding test is shown below.

After the folding test, the sample strip was placed on a leveled table to measure the angle at which the edge of the sample lifted off the table. The smaller the angle, the closer the sample is to the flat state before folding. The results are shown in Table 1. Note that each sample that broke in the middle of the sample are indicated as "Rupture".

<Flow Direction>

A sample strip having a short side (flow direction) of 30 mm×a long side (width direction) of 100 mm was cut out from the polyester film in each of Examples and Comparative Examples and evaluated in the same manner as described above.

<Details of Folding Test>

Figure 4:
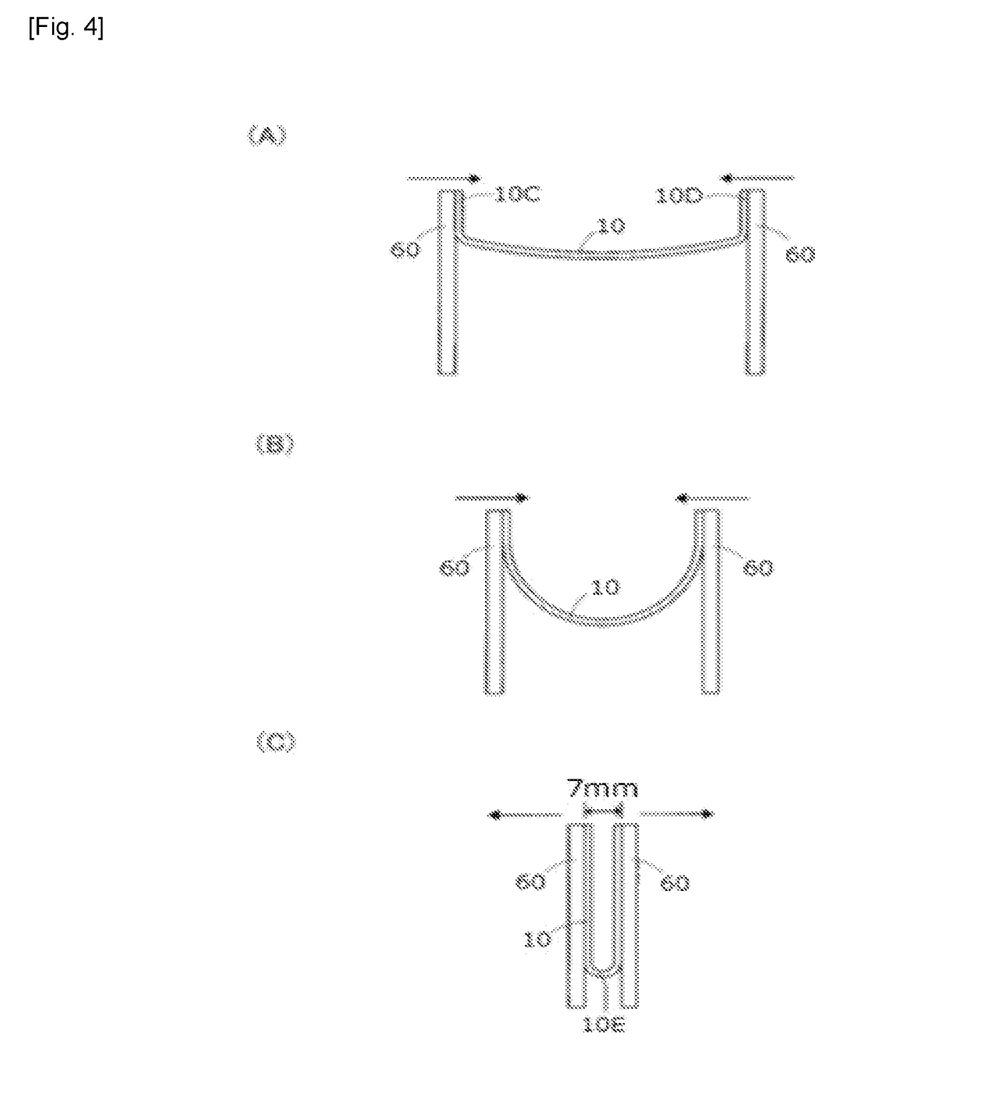

As shown in FIG. 4(A), during the continuous folding test, the edge 10C of the polyester film 10 and the edge 10D facing the edge 10C are each fixed to the corresponding parallelly disposed fixture 60 at the beginning. The fixtures 60 can be slidably moved in the horizontal direction.

Next, as shown in FIG. 4(B), the fixtures 60 are displaced so that they can be close to each other. This causes the polyester film 10 to be folded and deformed. Further, as shown in FIG. 4(C), the fixtures 60 are displaced so that the distance between the two edges of the polyester film 10, which edges face to each other and are secured by the fixtures 60, is 7 mm. Afterwards, the fixtures 60 is displaced in the opposite direction to eliminate the polyester film 10 deformation.

As shown in FIGS. 4(A) to (C), the displacement of the fixtures 60 can cause the polyester film 10 to be folded 180 degrees. In addition, the continuous folding test is performed such that the bent portion 10E of the polyester film 10 does not protrude from the bottom edge of each fixture 60. Also, the distance between the fixtures 60 when they are closest to each other is controlled to 7 mm. By doing so, the distance between the two opposing edges of the polyester film can be 7 mm.

1-6. Rainbow Unevenness

Samples prepared in the section 1-1 were each arranged on the polarization plate on the viewing side of the image display device as configured below so that the width direction of the samples was parallel to the horizontal direction of the screen. Next, the image display system was turned on in a dark room environment and inspected from various angles with naked eyes. The following criteria were used to evaluate the presence or absence of rainbow unevenness.

A: Rainbow unevenness was not visible.
 B: Rainbow unevenness was viewed in a small part of the region
 C: Rainbow unevenness was viewed in most of the region.

<Configuration of Image Display Device>

(1) Backlight light source: White LED or cold cathode tube
 (2) Polarization plate on the light source side: Having TAC films as protective films on both sides of the polarizer made of PVA and iodine. The polarizer is positioned so that the direction of the absorption axis is perpendicular to the horizontal direction of the screen.
 (3) Image display cell: Liquid crystal cell
 (4) Viewing-side polarization plate: Polarization plate in which a TAC film is used as a polarizer protection film for the polarizer made of PVA and iodine. The polarizer is positioned so that the direction of the absorption axis is perpendicular to parallel direction of the screen.
 (5) Size: 10 inches diagonal 1-7. Anti-Adherence The polyester film in each of Examples, Comparative Examples, and Reference Examples was cut out at 100 mm×100 mm to prepare 5 sheets each. The five cut-out films are aligned in the cut direction and stacked in five sheets, and a load of 500 g/cm$^2$ is applied thereto using "Blocking Tester (Constant load type), product number: CO-201, pressuring surface: $\phi$80 mm" manufactured by TESTER SANGYO CO., LTD. The sample is left at a temperature of 40° C. for 3 days under load. The anti-adherence was evaluated based on the following criteria in four interfaces where the films are in contact with each other.

A: All 4 interfaces can be peeled off easily.
 B: 3 or more of the 4 interfaces can be peeled off easily.
 C: 2 or less of the 4 interfaces can be peeled off easily.

1-8. Adhesion

On the polyester film of each of Examples Comparative Examples, or Reference Examples, a hard coating layer-forming coating liquid of the following composition was applied and then dried at 70° C. for 1 minute to volatilize the solvent. Subsequently, UV irradiation (100 mJ/cm$^2$) was applied to form a hard coating layer (5 μm in dry thickness) to obtain a laminate with a hard coating layer on the polyester film.

A sample strip having a short side (flow direction) of 30 mm×a long side (width direction) of 100 mm was cut out from the laminate to conduct the same continuous folding test as in the section 1-5. Two tests were conducted, one with the distance between the fixtures 60 when they were closet to each other at 7 mm and the other at 5 mm.

After the folding test, the adhesion between the polyester film and the hard coating layer was visually evaluated according to the following criteria.

A: The hard coating layer did not peel off from the polyester film even when the number of the folding test reached 100,000 times.
 B: A very small portion of the hard coating layer peeled off from the polyester film when the number of the folding test reached 100,000 times, but the hard coating layer did not peel off from the polyester film when the number of the folding test reached 50,000 times.
 C: A large portion of the hard coating layer peeled off from the polyester film when the number of the folding test reaches 100,000 times. Alternatively, at least a part of the hard coating layer peeled off from the polyester film when the number of the folding test reached 50,000 times.

<Coating Liquid for Hard Coating Layer>
Ionizing radiation curable compound 1: 0.6 parts by mass
(compound α synthesized in the following step)
Ionizing radiation curable compound 2: 0.2 parts by mass
("EBECRYL 230"; solid content: 100%; manufactured by Daicel Corporation)
Ionizing radiation curable compound 3: 0.2 parts by mass
(trade name "Light Acrylate IAA"; solid content: 100%; manufactured by Kyoeisha Chemical Co., Ltd.)
Leveling agent: 0.01 parts by mass
(trade name "10-28 (TL)"; solid content: 10% by mass; manufactured by Dainishiseika Color & Chemicals Mfg. Co., Ltd.)
Photopolymerization initiator: 0.1 parts by mass
(product name "Omnirad 184"; IGM Resins B.V.)
Solvent
(a mixed solvent containing methyl isobutyl ketone and cyclohexanone at 5:5; the solvent is used in such an amount that the solid content of the coating liquid is 35% by mass.)

<Synthesis of Compound α>

Air gas was introduced into a reaction vessel equipped with an agitator, a thermometer, a cooling tube, and a nitrogen gas introduction tube. Subsequently, 57 parts by mass of pentaerythritol acrylate, 43 parts by mass of pentaerythritol tetraacrylate, 0.02 parts by mass of dibutyltin dilaurate, 0.02 parts by mass of p-methoxyphenol, and 30 parts by mass of butyl acetate were charged into the reaction vessel, and the temperature was increased with stirring to 60° C. under nitrogen flow. Then, 30 parts by mass of hexamethylene diisocyanate was charged into a dropping vessel and evenly added dropwise to the reaction vessel over 1 hour. After the dropwise addition, the temperature of the reaction vessel was increased to 75° C. and kept at 75±3° C. for 6 hours. Subsequently, 150 parts by mass of methyl ethyl ketone was added to obtain a clear resin solution. Finally, the solvent was removed using an evaporator to obtain a compound α. The compound α is an ionizing radiation curable compound.

2. To Produce and Prepare Polyester Film

Example 1

First, 1 kg of PET (melting point: 258° C.; absorption center wavelength: 320 nm) and 0.1 kg of UV absorber (2,2'-(1,4-phenylene)bis(4H-3,1-benzoxazinon-4-one)) were melt-mixed at 280° C. in a kneader to produce a pellet containing the UV absorber. The pellet and PET with a melting point of 258° C. were fed into a single screw extruder, melted and kneaded at 280° C., and extruded through a T-die to prepare a casting film by casting on a cast drum with a controlled surface temperature of 25° C. The amount of UV absorber in the casting film was 1 part by mass per 100 parts by mass of PET.

The resulting casting film was heated by a group of rolls set at 95° C. and then stretched 5.1 times in the flow direction while both sides of the film being heated by a radiation heater so that the temperature of the film at the 250-mm point in the 400-mm stretching section (having a starting point with a stretching roll A and an ending point with a stretching roll B, each of which has two nip rolls) was 103° C., and then once cooled. Note that during heating with the radiation heater, turbulence was created on the front and back sides of the film by blowing air at 92° C. and 4 m/s from the side opposite to the film of the radiation heater toward the film, so that the temperature uniformity of the film was disturbed.

Subsequently, corona discharge treatment was applied to both sides of this uniaxially stretched film in air to set the wetting tension of the base film to 55 mN/m. The corona discharge treated surfaces on the both sides of the film were in-line coated with a "lubricative layer coating liquid containing polyester resin with a glass transition temperature of 18° C., polyester resin with a glass transition temperature of 82° C., and silica particles with an average particle size of 100 nm" to form each lubricative layer.

Next, the uniaxially stretched film was guided to a tenter, preheated with hot air at 95° C., and stretched 4.5 times in the film width direction at 105° C. in the first stage and 140° C. in the second stage. Here, when the stretching section in the width direction was divided into two sections, the film was stretched in two steps so that the amount of film stretch at the midpoint of the stretching section in the width direction (film width at measurement point–film width before stretching) was 80% of the amount of stretch at the end of the stretching section in the width direction. The film stretched in the width direction was heat-treated for 7 seconds with hot air in a tenter as it was. The hot air was heated stepwise from 180° C. to 245° C. Subsequently, 1% relaxation treatment was applied in the width direction at the same temperature of 245° C. Further, the film was quickly cooled to 100° C., followed by another 1% relaxation treatment in the width direction. The film was then rolled up to obtain a biaxially stretched polyester film with a thickness of 40 μm of Example 1.

Example 2

A biaxially stretched polyester film with a thickness of 40 μm of Example 2 was produced by the same procedure as in Example 1, except that the stretching factor in the flow direction was changed from 5.1 times to 3.8 times.

Example 3

A biaxially stretched polyester film of Example 3 was produced by the same procedure as in Example 1, except that the casting film was thickened, the final thickness was changed to 80 μm, and the stretching factor in the flow direction was changed from 5.1 times to 3.8 times.

Example 4

A biaxially stretched polyester film of Example 4 was produced by the same procedure as in Example 1, except that the stretching factor in the flow direction was changed from 5.1 times to 4.7 times, and the stretching factor in the width direction was changed from 4.5 times to 5.2 times.

Comparative Example 1

A commercially available biaxially stretched polyester film (product name: Cosmoshine A4300; thickness: 23 μm, manufactured by Toyobo Co., Ltd.) was prepared as a polyester film of Comparative Example 1.

Comparative Example 2

A commercially available biaxially stretched polyester film (product name: Cosmoshine TA044; thickness: 80 μm, manufactured by Toyobo Co., Ltd.) was prepared as a polyester film of Comparative Example 2.

Comparative Example 3

A biaxially stretched polyester film of Comparative Example 3 was produced by the same procedure as in Example 1, except that the stretching factor in the flow direction was changed from 5.1 times to 3.6 times, and the stretching factor in the width direction was changed from 4.5 times to 5.0 times.

Comparative Example 4

The stretching factor in the flow direction was changed from 5.1 times to 5.5 times, and the stretching factor in the width direction was changed from 4.5 times to 4.7 times. Further, during stretching in the flow direction, air at 92° C. and 4 m/s was not brown from the side opposite to the film of the radiation heater toward the film and changed so as not to create turbulence on the front and back sides of the film. A biaxially stretched polyester film of Comparative Example 4 was produced by the same procedure as in Example 1, except for the above changes.

Reference Example 1

A biaxially stretched polyester film with a thickness of 40 μm of Reference Example 1 was produced by the same procedure as in Example 1, except that the stretching factor in the flow direction was changed from 5.1 times to 4.1 times.

Reference Example 2

A biaxially stretched polyester film with a thickness of 40 μm of Reference Example 2 was produced by the same procedure as in Example 1, except that the stretching factor in the flow direction was changed from 5.1 times to 4.3 times.

Reference Example 3

Under a nitrogen gas atmosphere, 4.85 g of dimethyl terephthalate, 4.4 g of 1,2-propylene glycol, 6.8 g of p-toluic acid, and 10 mg of tetraisopropyl titanate were mixed and stirred for 2 hours at 140° C. The mixture was then stirred for another 16 hours at 210° C. Next, the temperature was lowered to 170° C., and the unreacted 1,2-propylene glycol was distilled off under reduced pressure to obtain a polyester pellet. In the same manner as in Example 1, an UV absorber was added so that the amount of the UV absorber in the pellet was 1 part by mass per 100 parts by mass of PET. The polyester pellet is considered to have a toluyl acid ester at the end because monocarboxylic acid is used in an amount of 2 mol per mol of dicarboxylic acid.

A biaxially stretched polyester film with a thickness of 40 μm of Reference Example 3 was produced by the same procedure as in Example 1, except that the PET material system was changed, the temperature during stretching was changed to 175° C., the stretching factor in the flow direction was changed to 1.5 times, and the stretching factor in the width direction was to 1.5 times. Note that the film displacement speed during heating and stretching was 20 m/min. The stretching was performed at a temperature of 175° C. in the preheat zone and at a temperature of 160° C. in the cooling zone.

TABLE 1

|  |  | Example 1 | Example 2 | Example 3 | Example 4 | Comparative Example 1 | Comparative Example 2 | Comparative Example 3 | Comparative Example 4 | Reference Example 1 | Reference Example 2 | Reference Example 3 |
|---|---|---|---|---|---|---|---|---|---|---|---|---|
| HM (N/mm$^2$) | | 157.1 | 157.8 | 160.3 | 174.0 | 127.9 | 130.9 | 160.8 | 165.0 | — | — | — |
| HM3σ (N/mm$^2$) | | 17.7 | 27.3 | 21.9 | 26.0 | 99.0 | 40.5 | 39.0 | 7.0 | 12.6 | 9.3 | 6.9 |
| Elastic deformation power (%) | | 62.1 | 63.5 | 63.4 | 62.3 | 65.7 | 65.1 | 62.8 | 62.4 | — | — | — |
| 3σ of elastic deformation power (%) | | 0.42 | 3.72 | 2.13 | 3.3 | 17.55 | 8.19 | 7.79 | 0.12 | — | — | — |
| Re (nm) | | 361 | 805 | 1392 | 536 | 924 | 8257 | 634 | 1530 | — | — | — |
| Rth (nm) | | 4982 | 4720 | 9305 | 4824 | 3497 | 7610 | 5876 | 3978 | — | — | — |
| Re/Rth | | 0.072 | 0.171 | 0.150 | 0.111 | 0.264 | 1.085 | 0.108 | 0.385 | — | — | — |
| Direction of slow axis (degree) | D1 | 82.00 | 83.00 | 76.00 | 84.10 | 59.22 | 89.51 | 80.30 | 88.70 | — | — | — |
| | D2 | 86.00 | 85.00 | 83.00 | 87.30 | 58.75 | 89.44 | 84.70 | 88.40 | — | — | — |
| | D3 | 86.00 | 81.00 | 79.00 | 83.40 | 58.55 | 89.55 | 82.10 | 88.20 | — | — | — |
| | D4 | 85.00 | 80.00 | 84.00 | 82.60 | 59.38 | 89.87 | 83.30 | 88.90 | — | — | — |
| | D5 | 79.00 | 84.00 | 80.00 | 81.40 | 59.15 | 89.55 | 81.10 | 88.10 | — | — | — |
| | Condition 1: max − min | 7.00 | 5.00 | 8.00 | 5.90 | 0.83 | 0.43 | 4.40 | 0.80 | — | — | — |
| Pencil hardness | Slow axis direction | F | F | F | F | 3B | 2B | B | F | — | — | — |
| | Fast axis direction | F | F | F | F | 3B | 2B | B | F | — | — | — |
| Rainbow unevenness | | A | A | A | A | B | A | A | B | — | — | — |
| Bending resistance (TD) | | 10 degrees | 10 degrees | 20 degrees | 25 degrees | 0 degrees | Rupture | 25 degrees | 30 degrees | — | — | — |
| Bending resistance (MD) | | 10 degrees | 10 degrees | 20 degrees | 25 degrees | 30 degrees | 55 degrees | 25 degrees | 40 degrees | — | — | — |
| Anti-adherence | | A | A | A | A | A | A | A | B | A | B | C |
| Adhesion | Distance 7 mm | A | A | A | A | C | C | B | A | A | A | A |
| | Distance 5 mm | A | A | A | B | C | C | C | C | A | A | C |

The results of Table 1 have demonstrated that the polyester film of each Example, which has an average Martens hardness of 140.0 N/mm² or more and a standard deviation 3σ of the Martens hardness of 9.0 N/mm² or more and 36.0 N/mm², can be provided so as to have favorable pencil hardness regardless of the thickness and good adhesion to a functional layer. In addition, when the polyester film of each Example satisfies condition 1, it has also been demonstrated that a bending habit can be prevented from remaining after a bending test or a rupture can be prevented regardless of the bending direction.

REFERENCE SIGNS LIST

10 Polyester film
20 Display element
30 Polarization plate
31: Polarizer
32: First transparent protective plate
33: Second transparent protective plate
50: Housing
100: Image display device

The invention claimed is:

1. A polyester film having an average Martens hardness of 140.0 N/mm² or more at a polyester film surface, wherein a standard deviation 3σ of Martens hardness at the polyester film surface is 9.0 N/mm² or more and 36.0 N/mm² or less.

2. The polyester film according to claim 1, wherein a standard deviation 3σ of an average elastic deformation power at the polyester film surface is 7.0% or less.

3. The polyester film according to claim 1, having an average elastic deformation power of 40.0% or more at the polyester film surface.

4. The polyester film according to claim 1, having an in-plane phase difference of 300 nm or more and 1,450 nm or less.

5. The polyester film according to claim 1, wherein a value obtained by dividing an in-plane phase difference of the polyester film by a phase difference in a thickness direction of the polyester film is 0.15 or less.

6. The polyester film according to claim 1, having a thickness of 10 μm or more and 80 μm or less.

7. A polarization plate comprising: a polarizer; a first transparent protective plate disposed on one side of the polarizer; and a second transparent protective plate disposed on the other side of the polarizer, wherein at least one of the first transparent protective plate or the second transparent protective plate is the polyester film according to claim 1.

8. An image display device comprising a display element and a polyester film disposed on a light emitting surface side of the display element, wherein the polyester film is the polyester film according to claim 1.

9. The image display device according to claim 8, comprising a polarizer between the display element and the polyester film.

10. The polyester film according to claim 1, having the average Martens hardness of 140.0 N/mm² or more and the standard deviation 3σ of Martens hardness of 9.0 N/mm² or more and 36.0 N/mm² or less on both surfaces of the polyester film.

* * * * *